(12) United States Patent
Barkan et al.

(10) Patent No.: US 7,128,264 B2
(45) Date of Patent: Oct. 31, 2006

(54) ELECTRO-OPTICAL READER WITH IMPROVED PERFORMANCE IN HIGH INTENSITY AMBIENT LIGHT

(75) Inventors: Edward Barkan, Miller Place, NY (US); Peter Fazekas, Bayport, NY (US)

(73) Assignee: Symbol Technologies, Inc:, Holtsville, NY (US)

( * ) Notice: Subject to any disclaimer, the term of this patent is extended or adjusted under 35 U.S.C. 154(b) by 0 days.

(21) Appl. No.: 10/897,728

(22) Filed: Jul. 23, 2004

(65) Prior Publication Data

US 2006/0016893 A1 Jan. 26, 2006

(51) Int. Cl.
G06K 7/10 (2006.01)
(52) U.S. Cl. .................. 235/454; 235/462.14
(58) Field of Classification Search ............... 235/454, 235/455, 462.01, 462.45, 462.35, 462.32, 235/472.01, 462.14, 462.29; 330/277; 398/209
See application file for complete search history.

(56) References Cited

U.S. PATENT DOCUMENTS

| 4,591,802 | A | * | 5/1986 | Asazawa | 330/277 |
| 5,675,136 | A | * | 10/1997 | Keinath et al. | 235/454 |
| 5,770,847 | A | * | 6/1998 | Olmstead | 235/462.35 |
| 6,166,840 | A | * | 12/2000 | Barfod | 398/209 |
| 6,197,503 | B1 | * | 3/2001 | Vo-Dinh et al. | 435/6 |
| 6,329,881 | B1 | * | 12/2001 | Tachigori | 330/308 |
| 6,520,415 | B1 | * | 2/2003 | McMaster | 235/462.35 |
| 6,607,133 | B1 | * | 8/2003 | Wilz et al. | 235/462.45 |
| 6,708,883 | B1 | * | 3/2004 | Krichever | 235/462.01 |

* cited by examiner

Primary Examiner—Steven S. Paik
(74) Attorney, Agent, or Firm—Kirschstein, et al.

(57) ABSTRACT

A high gain, low signal-to-noise, transimpedance amplifier is prevented from saturation even in the presence of bright sunlight by an offset adjustment circuit utilizing a field effect transistor as a variable resistor.

8 Claims, 2 Drawing Sheets

ELECTRO-OPTICAL READER WITH IMPROVED PERFORMANCE IN HIGH INTENSITY AMBIENT LIGHT

BACKGROUND OF THE INVENTION

1. Field of the Invention

The present invention generally relates to electro-optical readers, such as laser scanners and, more particularly, to improved reader performance in ambient light of high intensity during reading of indicia, such as bar code symbols.

2. Description of the Related Art

Bar code readers are known in the prior art for reading various symbologies such as Universal Product Code (UPC) bar code symbols appearing on a label, or on the surfaces of an article. The bar code symbol itself is a coded pattern of graphic indicia comprised of a series of bars of various widths spaced apart from one another to bound spaces of various widths, the bars and spaces having different light reflecting characteristics. The readers electro-optically transform the graphic indicia into electrical signals, which are decoded into information, typically descriptive of the article or some characteristic thereof. Such information is conventionally represented in digital form and used as an input to a data processing system for applications in point-of-sale processing, inventory control, and the like.

Readers of this general type have been disclosed, for example, in U.S. Pat. No. 5,600,121, assigned to the same assignee as the instant application, and may employ a portable laser scanning device held by a user, which is configured to allow the user to aim the device and, more particularly, a scanning laser light beam, at a targeted symbol to be read. In moving laser beam readers known in the art, the laser light beam is focused by a lens or other optical components along a light path as a beam spot on a target that includes the bar code symbol. The moving-beam reader operates by repetitively scanning the beam spot in a scan pattern across the symbol by means of motion of a scanning component, such as a moving scan mirror placed in the path of the light beam. The scanning component may either sweep the beam spot across the symbol and trace a scan line, or a series of scan lines, or another pattern, across the symbol, or scan a field of view of the reader, or both.

Bar code readers also include a sensor or photodetector which detects light reflected or scattered from the symbol. The photodetector or sensor is positioned in the reader in an optical path so that it has a field of view which ensures the capture of a portion of the light which is reflected or scattered off the symbol. The light is detected and converted into an electrical signal. Electronic circuitry and software decode the electrical signal into a digital representation of the data represented by the symbol that has been scanned. For example, the analog electrical signal generated by the photodetector is converted by a digitizer into a pulse width modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented. Such signal processors are disclosed in U.S. Pat. No. 5,734,153, assigned to the same assignee as the instant application.

Bar code readers are required to work under variable ambient lighting conditions, including indoor office lighting and outdoor sunlight, both indoor and outdoor lighting ranging from dim to bright. A combination of optical and electrical measures is employed to prevent bright ambient light from overwhelming the reader and preventing a successful decoding and reading of a symbol to be read. Such measures can be optimized for indoor or outdoor lighting at anticipated light intensity levels, but not for both. Thus, performance is sacrificed when a reader is required to work at non-optimized light intensity levels.

One category of reader is termed retro-reflective or retro-collective and refers to the light collection optical system in which a field of view is scanned along with the laser beam. Typically, the scan mirror used to transmit the laser beam to the symbol also collects the light scattered from the symbol and directs the collected light to the sensor. This allows the field of view to be relatively small since it only needs to be large enough to see the focused laser beam spot plus accommodate manufacturing tolerances that tend to move the beam spot out of the center of the field of view.

The scan mirror in a retro-reflective reader needs to be relatively large, since the surface area of the scan mirror determines how much scattered light can be collected. However, a large scan mirror requires more electrical energy to be oscillated during scanning, can cause undesirable vibration when oscillated rapidly, and requires more protection from external shock forces. Even though these factors are undesirable for a handheld reader, most readers employ a retro-reflective system, primarily because such readers are relatively insensitive to different levels of ambient light that the small field of view affords.

Another category of reader is termed non-retro-reflective or non-retro-collective and refers to the light collection optical system in which the field of view is stationary. Typically, the scan mirror is only used to transmit the beam to the symbol, while a separate optical system having a wide, static field of view is employed to collect scattered light. The beam spot is swept in a scan pattern across the symbol, and the field of view must be large enough to allow the sensor to see the entire scan pattern, which may be a single line or a plurality of lines. Hence, the field of view of a non-retro-reflective system is several times larger than in a retro-reflective system, with a proportionate increase in the amount of ambient light collected along with light scattered from the symbol. Hence, it has been difficult to employ a non-retro-reflective system that works well in all ambient lighting conditions.

However, there are clear advantages to using a non-retro-reflective system. The scan mirror can be made very small since it only needs to accommodate the focused beam spot. The small scan mirror is much easier to oscillate without consuming large amounts of electrical power, creates less vibration even at high rates of oscillation, is much easier to shock-proof to prevent damage from external shock forces, and is less expensive as compared to the larger scan mirrors of the retro-reflective systems.

Clearly, it would be advantageous, especially in the case of handheld readers, to take advantage of the benefits of a non-retro-reflective system if the ambient light issues that result from its inherently large field of view could be reduced or eliminated. One step in this direction is to reduce the field of view in a non-retro-reflective system by using a lens to control the vertical dimension of the field of view, and by using the reader's housing to limit the horizontal dimension of the field of view. This enables the reader to work reliably under all anticipated, indoor, artificially illuminated lighting conditions, but there are still compromises that must be made if the reader is to work in direct sunlight, which can be over fifty times brighter than the brightest indoor lighting.

In a typical retro-reflective or non-retro-reflective reader, collection optics collect the laser light scattered from the symbol and concentrate the collected light onto a photodiode acting as the sensor. The collection optics also unavoidably collects ambient light and concentrates it on the photodiode. The photodiode generates an electrical current proportional to the brightness of the total collected light. The current is applied to an input of a transimpedance amplifier operative for generating an output voltage proportional to the current and, in turn, proportional to the brightness of the total collected light. The output voltage increases or decreases in dependence on increases or decreases in the collected light intensity. If the collected light intensity is bright enough, the output voltage will go so high that the amplifier is incapable of going any higher. This is called saturation and, when this happens, the reader will not function because the data signal derived from the symbol will be lost.

For this reason, standard practice, when designing readers that must work in bright sunlight, has been to decrease the gain of the transimpedance amplifier to the point where it will not be driven into saturation even in sunlight. As a result, non-retro-reflective readers, which have large fields of view and collect a lot of ambient light, have had to be designed with lower transimpedance amplifier gains than those in retro-reflective readers whose fields of view are smaller and therefore collect less ambient light. The gain of these transimpedance amplifiers is controlled by a feedback resistor. Reducing the resistance of the feedback resistor reduces the gain, and vice versa.

Unfortunately, reducing the resistance of the feedback resistor reduces the data signal faster than the noise signal such that the signal-to-noise ratio of the output signal of the amplifier becomes worse as the gain is reduced. Since non-retro-reflective readers needed to have lower gains (to prevent saturation) than retro-reflective readers, the non-retro-reflective readers have had poorer signal-to-noise ratios, which degrades their performance even when operating under indoor lighting conditions. Thus, the superior signal-to-noise ratio of retro-reflective readers and the concomitant extended working range are the main reasons for their popularity.

The prior art has proposed in FIGS. 9–11 of U.S. Pat. No. 5,923,021 preamplifier circuits for processing the output signal from a photodiode. These circuits include components that reduce the resistance of the feedback resistor, thereby reducing the gain and worsening the signal-to-noise ratio, or that introduce shot or white noise from bipolar transistors and diodes which again worsen the signal-to-noise ratio. Hence, such preamplifier circuits are unsatisfactory for enabling the reader to perform reliably under all lighting conditions.

SUMMARY OF THE INVENTION

Objects of the Invention

Accordingly, it is a general object of this invention to enable retro- and non-retro-reflective electro-optical readers to reliably read indicia under a broad range of different ambient lighting conditions.

More particularly, it is an object of the present invention to enhance reading of indicia without sacrificing transimpedance amplifier gain and without introducing additional noise to a signal processing circuit.

Still another object of the present invention is to enable non-retro-reflective readers to approach the performance levels of retro-reflective readers.

It is yet another object of the present invention to prevent high gain transimpedance amplifiers from saturating even in bright sunlight.

FEATURES OF THE INVENTION

In keeping with the above objects and others which will become apparent hereinafter, one feature of the present invention resides, briefly stated, in an arrangement for, and a method of, improving performance of an electro-optical reader for reading indicia, such as bar code symbols, across a broad range of ambient light. The arrangement includes a sensor for collecting light from the indicia, with concomitant collection of ambient light, to generate a sensor signal proportional to collected light intensity. Advantageously, the sensor is a photodiode that generates the sensor signal as a current signal.

The arrangement also includes an amplifier having an amplifier input connected to the sensor, and operative for amplifying the sensor signal to generate at an amplifier output an output amplified signal, preferably a voltage signal, proportional to the collected light intensity. A resistor is connected across the amplifier input and the amplifier output, for imparting to the amplifier a high gain sufficient to drive the amplifier into saturation in high intensity ambient light.

In accordance with this invention, an offset adjustment circuit is connected across the amplifier input and the amplifier output, for preventing the saturation, without reducing the high gain, of the amplifier in high intensity ambient light. The adjustment circuit has a variable resistance controlled by, and inversely proportional to, the output amplified signal. The resistance is decreased at the amplifier input when the output amplified signal is increased in high intensity ambient light to drive the amplifier away from saturation.

In the preferred embodiment, the adjustment circuit includes a field effect transistor (FET) serving as a variable resistor whose resistance is controlled by the output amplified signal. When the output amplified signal approaches a level that would otherwise cause saturation, the resistance of the FET drops, and an offset current is applied to the amplifier input which, in turn, forces the amplifier away from saturation. The brighter the ambient light, the larger the offset current and, hence, the amplifier will not saturate even under the brightest sunlight. As a result, the amplifier gain can be as high as desired to maximize the signal-to-noise ratio without fear of saturation. Also, the variable resistor does not affect the resistance of the feedback resistor, does not change the amplifier gain, and does not introduce shot or white noise into the output amplified signal.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
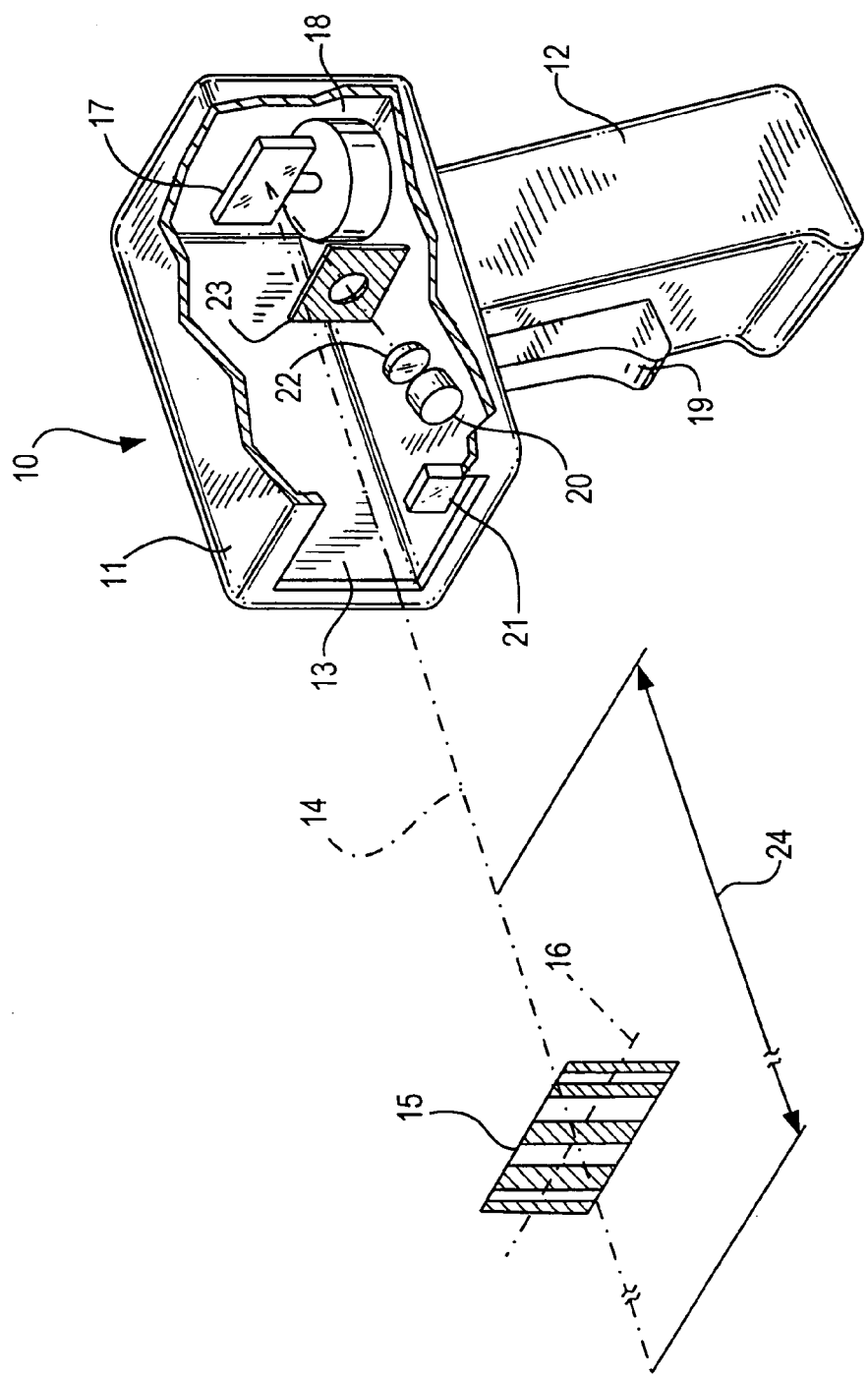
FIG. 1 is a perspective view of a non-retro-reflective electro-optical reader in accordance with the prior art.

As used herein, the term "symbol" broadly encompasses not only symbol patterns composed of alternating bars and spaces of various widths as commonly referred to as bar code symbols, but also other one- or two-dimensional graphic patterns, as well as alphanumeric characters. In general, the term "symbol" may apply to any type of pattern or indicia which may be recognized or identified either by scanning a light beam and detecting reflected or scattered light as a representation of variations in light reflectivity at various points of the pattern or indicia. FIG. 1 shows an indicia 15 as one example of a "symbol" to be read.

FIG. 1 depicts a handheld laser scanner device 10 for reading symbols. The laser scanner device 10 includes a housing having a barrel portion 11 and a handle 12. Although the drawing depicts a handheld pistol-shaped housing, the invention may also be implemented in other types of housings such as a desk-top workstation or a stationary scanner. In the illustrated embodiment, the barrel portion 11 of the housing includes an exit port or window 13 through which an outgoing laser light beam 14 passes to impinge on, and scan across, the bar code symbol 15 located at some distance from the housing.

The laser beam 14 moves across the symbol 15 to create a scan pattern. Typically, the scanning pattern is one-dimensional or linear, as shown by line 16. This linear scanning movement of the laser beam 14 is generated by an oscillating scan mirror 17 driven by an oscillating motor 18. If desired, means may be provided to scan the beam 14 through a two-dimensional scanning pattern, to permit reading of two-dimensional optically encoded symbols. A manually-actuated trigger 19 or similar means permit an operator to initiate the scanning operation when the operator holds and aims the device 10 at the symbol 15.

The scanner device 10 includes a laser source 20, e.g., a gas laser tube or a semiconductor laser diode, mounted within the housing. The laser source 20 generates the laser beam 14. A photodetector 21 is positioned within the housing to collect at least a portion of the light reflected and scattered from the bar code symbol 15. The photodetector 21, as shown, faces toward the window 13 and has a static, wide field of view characteristic of the non-retro-reflective readers described above. Alternatively, in a retro-reflective reader, a concave portion of the scan mirror 17 may focus collected light on the photodetector 21, in which case the photodetector faces toward the scan mirror. As the beam 14 sweeps the symbol 15, the photodetector 21 detects the light reflected and scattered from the symbol 15 and creates an analog electrical signal proportional to the intensity of the collected light. Details of the processing of this analog signal, especially in different ambient lighting conditions, form the basis of this invention and are described in detail below.

A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

The laser source 20 directs the laser beam through an optical assembly comprising a focusing lens 22 and an aperture stop 23, to modify and direct the laser beam onto the scan mirror 17. The mirror 17, mounted on a vertical shaft and oscillated by the motor drive 18 about a vertical axis, reflects the beam and directs it through the exit port 13 to the symbol 15.

To operate the scanner device 10, the operator depresses trigger 19 which activates the laser source 20 and the motor 18. The laser source 20 generates the laser beam which passes through the element 22 and aperture 23 combination. The element 22 and aperture 23 modify the beam to create an intense beam spot of a given size which extends continuously and does not vary substantially over a range 24 of working distances. The element and aperture combination directs the beam onto the rotary mirror 17, which directs the modified laser beam outwardly from the scanner housing 11 and toward the bar code symbol 15 in a sweeping pattern, i.e., along scan line 16. The bar code symbol 15, placed at any point within the working distance 24, reflects and scatters a portion of the laser light. The photodetector 21, shown mounted in the scanner housing 11 in a non-retro-reflective position, detects the reflected and scattered light and converts the received light into an analog electrical signal. The photodetector could also be mounted in a retro-reflective position facing the scan mirror 17. The system circuitry then converts the analog signal to a pulse width modulated digital signal which a microprocessor-based decoder decodes according to the characteristics of the bar code symbology rules.

Figure 2:
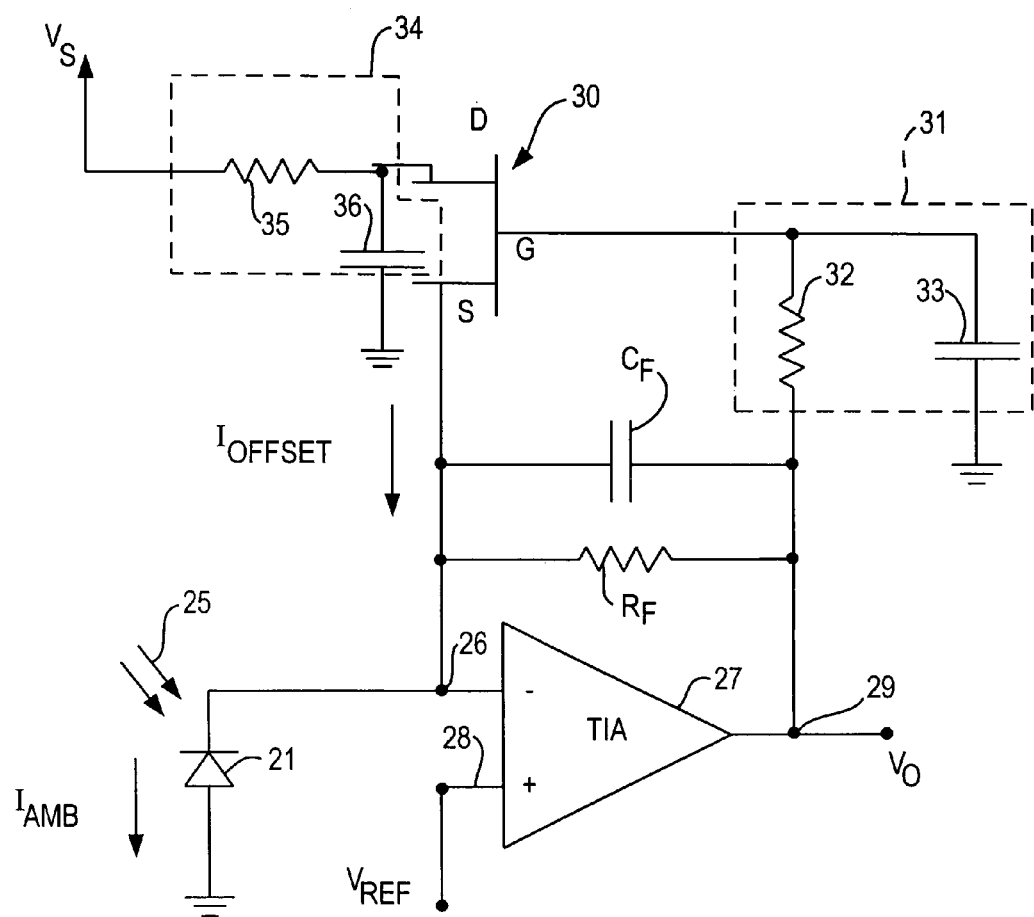
FIG. 2 is a circuit schematic of an arrangement for improving performance in accordance with this invention for use with the reader of FIG. 1.

In accordance with this invention, as shown in FIG. 2, the photodetector 21, shown as a photodiode, collects light 25 from the symbol 15, as well as from ambient light, and generates a sensor signal, shown as an electrical current $I_{AMB}$ whose magnitude is proportional to the intensity of the collected light. Thus, the sensor signal has a data component that corresponds to the information encoded in the symbol, as well as a noise component that corresponds to the ambient light.

The sensor signal is applied to a negative, inverting amplifier input 26 of a transimpedance amplifier (TIA) 27 which has another positive, non-inverting amplifier input 28 connected to a d.c. reference voltage $V_{REF}$. The TIA 27 amplifies the sensor signal to generate an output amplified signal, shown as output voltage $V_O$ whose magnitude is also proportional to the intensity of the collected light at amplifier output 29. Although the TIA is represented by a single triangular symbol, it is not to be restricted to the use of one operational amplifier. More than one operational amplifier may be used to achieve higher bandwidth. They symbol TIA also includes additional transistor amplifiers.

A feedback resistor $R_F$ is connected across the TIA, for imparting to the TIA a high gain sufficient to drive the TIA into saturation in the presence of high intensity ambient light, such as sunlight. As explained above, a high gain is desirable for a superior signal-to-noise ratio and a long working range, but causes the TIA to be more readily driven into saturation, especially in the presence of bright ambient light. A feedback capacitor $C_F$ is connected in parallel to the feedback resistor. In a preferred embodiment, $R_F$ is 400 kilohms and $C_F$ is 1.8 picofarads.

An offset adjustment circuit is connected across the amplifier input 26 and the amplifier output 29, and is operative for preventing saturation of the TIA, without reducing its high gain, in bright ambient light. The adjustment circuit includes a field effect transistor (FET) 30 having a gate terminal (G) connected to the amplifier output 29 via a first filter 31 comprising a resistor 32 and a capacitor 33, a source terminal (S) connected to the amplifier input 26, and a drain terminal (D) connected to a d.c. source of voltage $V_S$ via a second filter 34 comprising a resistor 35 and a capacitor 36.

The FET is a variable resistor and has a resistance controlled by, and inversely proportional to, the output amplified signal $V_O$. When the output of the TIA approaches saturation, the FET resistance drops, and an offset current $I_{OFFSET}$ is applied to the amplifier input 26 which, in turn, forces the output of the TIA away from saturation. The brighter the ambient light, the larger the offset current and, hence, the TIA will not saturate even under bright sunlight. As a result, the gain of the TIA can be as high as desired to maximize the signal-to-noise ratio without fear of saturation.

When the FIG. 2 arrangement is exposed to indoor ambient light, i.e., light intensities less than sunlight, the output amplified signal is low enough so that the FET does not turn on at all, thereby essentially removing the FET from the circuit. Thus, the FET adds no noise even though it is connected to a very high gain amplifier.

The first filter 31 serves to filter out the high frequency data component that corresponds to the symbol, so that only the large d.c. signal caused by bright sunlight controls the FET. The second filter 34 serves to filter out high frequency noise that might be present in the supply source $V_S$ to eliminate the possibility of noise inadvertently being conducted to the amplifier input 26.

It will be understood that each of the elements described above, or two or more together, also may find a useful application in other types of constructions differing from the types described above.

While the invention has been illustrated and described as embodied in an electro-optical reader with improved performance in high intensity ambient light, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for improving performance of an electro-optical reader for reading indicia across a range of ambient light, comprising:
   a) a sensor for collecting light from the indicia, with concomitant collection of ambient light, to generate a sensor signal proportional to collected light intensity;
   b) an amplifier having an amplifier input connected to the sensor, and operative for amplifying the sensor signal to generate at an amplifier output an output amplified signal proportional to the collected light intensity;
   c) a resistor connected across the amplifier input and the amplifier output, for imparting to the amplifier a high gain sufficient to drive the amplifier into saturation in ambient light of high intensity;
   d) an offset adjustment circuit connected across the amplifier input and the amplifier output, for preventing the saturation, without reducing the high gain, of the amplifier in high intensity ambient light, the adjustment circuit including a field effect transistor (FET) having a gate terminal connected to the amplifier output, a source terminal connected to the amplifier input, and a drain terminal connected to a voltage source, the FET serving as a variable resistor having a variable resistance controlled by, and inversely proportional to, the output amplified signal, the resistance being decreased at the amplifier input when the output amplified signal is increased in high intensity ambient light to drive the amplifier away from saturation; and
   e) a filter circuit connected to the drain terminal of the FET, for filtering out high frequency noise from the voltage source from reaching the amplifier input.

2. The arrangement of claim 1, wherein the sensor is a photodiode that generates the sensor signal as a current signal.

3. The arrangement of claim 2, wherein the amplifier is a transimpedance amplifier that generates the output amplified signal as a voltage signal.

4. The arrangement of claim 3, wherein the transimpedance amplifier has a non-inverting input to which a reference voltage is applied, and wherein the amplifier input is an inverting input.

5. The arrangement of claim 4, and a feedback capacitor connected across the inverting input and the amplifier output.

6. The arrangement of claim 1, and another filter circuit connected to the gate terminal, for filtering out the high frequency noise from the amplified output signal.

7. A method of improving electro-optically reading indicia across a range of ambient light, comprising the steps of:
   a) collecting light from the indicia, with concomitant collection of ambient light, to generate a sensor signal proportional to collected light intensity;
   b) amplifying the sensor signal at an amplifier input with an amplifier to generate at an amplifier output an output amplified signal proportional to the collected light intensity;
   c) imparting to the amplifier a high gain sufficient to drive the amplifier into saturation in ambient light of high intensity by connecting a resistor across the amplifier input and the amplifier output;
   d) preventing the saturation, without reducing the high gain, of the amplifier in high intensity ambient light, by inversely controlling resistance at an amplifier input by the output amplified signal, the resistance being decreased at the amplifier input when the output amplified signal is increased in high intensity ambient light to drive the amplifier away from saturation, the controlling step being performed by connecting a gate terminal of a field effect transistor (FET) to the amplifier output, by connecting a source terminal of the FET to the amplifier input, and by connecting a drain terminal of the FET to a voltage source; and
   e) connecting a filter circuit to the drain terminal of the FET, for filtering out high frequency noise from the voltage source from reaching the amplifier input.

8. The method of claim 7, and the step of connecting another filter circuit to the gate terminal, for filtering out the high frequency noise from the amplified output signal.

* * * * *